(12) United States Patent
Huang et al.

(10) Patent No.: US 8,723,871 B2
(45) Date of Patent: May 13, 2014

(54) METHOD AND APPARATUS FOR DISPLAYING BRANCH STRUCTURE (75) Inventors: Chih-Hsien Huang, New Taipei (TW); Sheng-Chi Yu, New Taipei (TW)

(73) Assignee: MStar Semiconductor, Inc., Hsinchu County (TW)

( * ) Notice: Subject to any disclaimer, the term of this patent is extended or adjusted under 35 U.S.C. 154(b) by 198 days.

(21) Appl. No.: 13/304,963

(22) Filed: Nov. 28, 2011

(65) Prior Publication Data

US 2012/0256907 A1 Oct. 11, 2012

(30) Foreign Application Priority Data

Apr. 8, 2011 (TW) .............................. 100112341 A (51) Int. Cl.
*G06T 17/05* (2011.01)
(52) U.S. Cl.
USPC ......................................... 345/441; 345/588
(58) Field of Classification Search
USPC ....................................................... 345/440
See application file for complete search history.

(56) References Cited

U.S. PATENT DOCUMENTS 4,694,407 A * 9/1987 Ogden .......................... 345/441
7,098,917 B2 * 8/2006 Kurzweil ...................... 345/441

OTHER PUBLICATIONS

Oppenheimer, Peter E. "Real time design and animation of fractal plants and trees." ACM SiGGRAPH Computer Graphics. vol. 20. No. 4. ACM, 1986.*
Jiang, Lin, Xianchun Guo, and Ling Lu. "An algorithm of fractal tree generate base on controllable random transform." Computer Modeling and Simulation, 2009. ICCMS'09. International Conference on. IEEE, 2009.*

* cited by examiner

*Primary Examiner* — David Zarka
*Assistant Examiner* — Richard M Russell
(74) *Attorney, Agent, or Firm* — WPAT, PC; Justin King (57) ABSTRACT

A method and apparatus for displaying a branch structure by emulating natural visual effects of a branch structure, e.g., lightning, is provided. The branch structure comprises branches each formed by segments. Each segment is generated by randomly providing a segment end position according to a segment start position, and randomly determining whether another branch is provided at each segment.

20 Claims, 8 Drawing Sheets

METHOD AND APPARATUS FOR DISPLAYING BRANCH STRUCTURE

This application claims the benefit of Taiwan application Serial No. 100112341, filed Apr. 8, 2011, the subject matter of which is incorporated herein by reference.

BACKGROUND OF THE INVENTION

1. Field of the Invention

The invention relates in general to a method and apparatus for displaying a branch structure, and more particularly to a method and apparatus for quickly emulating natural and generated visual effects having a branch structure.

2. Description of the Related Art

Various devices with a display function including televisions, mobile phones, walkmans, digital frames, personal computers, laptop computers, tablet computers, personal digital assistants (PDA), digital cameras, digital video cameras, and electronic book readers, are prevailing in the modern society we live in and have become ubiquitous in every day life. Therefore, it is one of the most important research and development goals for current information developers to offer diversified display contents and methodologies for the above devices in an efficient and productive manner.

SUMMARY OF THE INVENTION

Natural visual effects rendered by natural phenomena and natural objects add beneficial visual effects to various types of display contents. Many natural phenomena and natural objects are consisted of various types of branch structures. For example, the visual effect of lightning presents one such branch structure. Other types of natural phenomena, such as branching streams, main courses of rivers on maps, trees, coral, antlers, cracks, fissures, and mountain landscapes, all present differing types of branch structure as well. The sheer number of naturally occurring and generated visual effects which may be considered to include branch structure is practically infinite.

Therefore, the present invention provides an efficient technique that speedily emulates a given branch structure to offer more diversified display contents and provide enhanced display modeling and rendering on modern computing devices.

According to an aspect of the present invention, a method for displaying a branch structure by emulating a branch structure with natural visual effects is provided. The branch structure comprises branches which make up each comprising segment. The method comprises performing a segment generating step to randomly provide an end position according to a start position in a first random step and to provide a segment according to the start position and the end position, so as to provide a branch by utilizing the segment; and randomly determining whether to provide another branch from the segment in a second random step.

The segment generating step may be iterated for a first number of times to perform a branch generating step. During each iteration of the segment generating step, the start position of a current segment generating step is updated according to the end position of a previous segment generating step. Thus, the first number of segments provided by the first number of segment generating steps are connected to form a branch of the branch structure. The branch generating step may be iterated for a second number of times to form the branch structure by utilizing the second number of branches.

In the present invention, a branch level parameter is respectively provided to the branches of the branch structure. For example, the branch structure may comprise a main branch. First level branches developed from segments of the main branch are given lower branch level parameters, and second level branches developed from segments of the first level branches are given even lower branch level parameters.

In the first segment generating step for generating a first segment of a branch in the branch generating step, a display parameter corresponding to the first segment is provided according to the branch level parameter corresponding to the branch, e.g., a color and/or a blending alpha. For example, a first segment of a branch having a higher branch level parameter may be given a greater blending alpha value so that the higher level branch appears more apparent. When iterating the segment generating step for forming other segments of the same branch, the display parameter of a current segment generating step may be updated according to the display parameter of a previous segment generating step. For example, the blending alpha of the current segment is lower than that of the previous segment, so that the color and obviousness of the current segment appear less distinct from the previous segment. Thus, when displaying the branch structure according to the display parameters of the segments, the branches and the segments are presented in well-distributed and organized colors to more realistically emulate natural visual effects.

When performing the branch generating step to provide a branch of the branch structure, the number of iterating steps the segment generating step makes may also be determined according to the branch level parameter of the branch. For example, the segment generating step is iterated with a greater number of times when generating a branch having a higher branch level parameter so that the branch comprises more segments.

When iterating the segment generating step for generating segments of a branch in the branch generating step, the end position may be randomly determined according to position statistical information and the start point of the segment during the first random step. For example, a circle parallel to an xy plane may be determined by a three-dimensional coordinate (x0, y0, z0) of the start position. The circle has a center (x0, y0, z1) and a randomly determined radius, and the end position is placed on the circumference of the circle. For example, the position statistical information comprises information including an expected value and variances of the radius for randomly determining the radius. Further, z1 may equal to z0+dz, where dz is a random value. The position statistical information may include an expected value and variances of dz.

When performing the branch generating step to generate a branch of the branch structure, position statistical information corresponding to the segments of the branch may be provided according to the branch level parameter corresponding to the branch. For example, a branch having a higher branch level parameter may have a greater radius expected value, so that the branch having a higher branch level parameter may comprise segments distributed within greater ranges.

When performing the segment generating step of the branch generating step, a branch start position is added to a branch start position queue when it is determined to provide another branch from the segment being generated. For example, the branch start position may be the start position or end position of the segment. When iterating the branch generating step to generate the branches, the branch start position may be sequentially obtained from the branch start point queue to serve as the start point for the first segment generating step in the branch generating step.

According to another aspect of the present invention, an apparatus for displaying a branch structure by emulating a branch structure to provide natural visual effects is provided. The apparatus may be realized by any combination of hardware, firmware, and/or software. The apparatus comprises a segment generating module, a branch generating module, a main module, and a display module. The branch generating module prompts the segment generating module to iterate operations for a first number of times to provide a first number of segments for a branch. The main module prompts the branch generating module to iterate operations for a second number of times to generate a second number of branches. The display module displays the branch structure to present natural visual effects.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
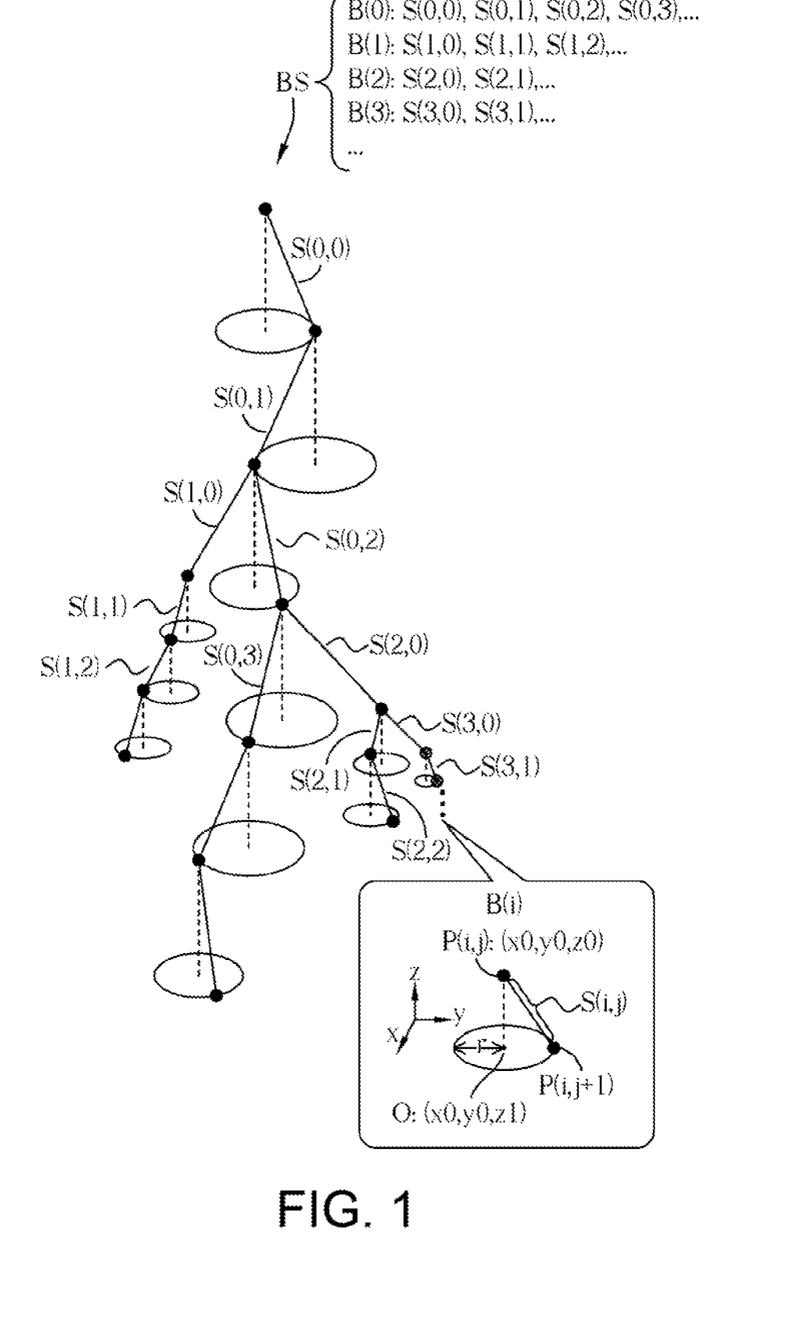
FIG. 1 is a schematic diagram of a branch structure according to an embodiment of the present invention.
Figure 2:
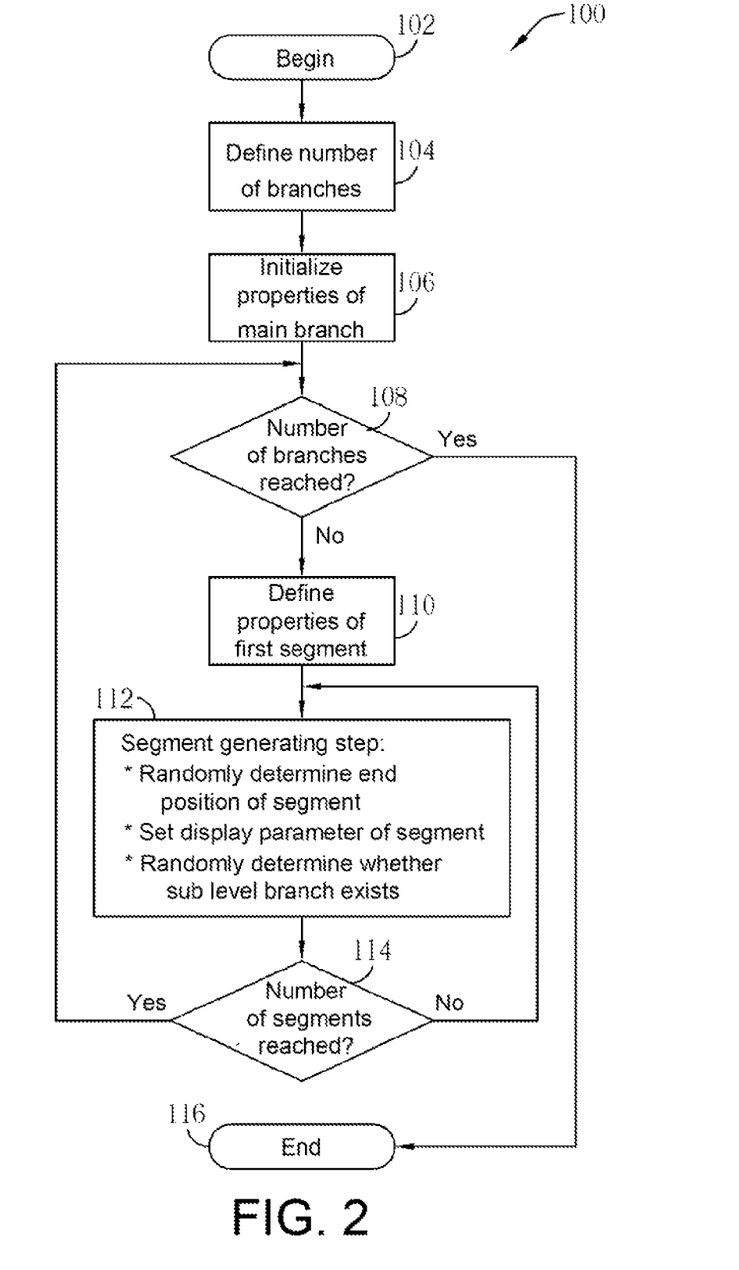
FIG. 2 is a flowchart of a method according to an embodiment of the present invention.

FIG. 1 shows a branch structure BS according to an embodiment of the present invention. FIG. 2 shows a flowchart 100 of a method for generating the branch structure BS according to an embodiment of the present invention, so as to emulate a natural phenomenon or a natural object, e.g., lightning, to render naturally appearing visual effects. As shown in FIG. 1, the branch structure BS comprises a plurality of branches $B(0)$, $B(1)$, $B(2)$, and $B(3)$, each of which comprises a plurality of segments. Each branch, $B(i)$, of the branch structure comprises segments $S(i,j)$. For example, the branch $B(0)$ comprises segments $S(0, 0)$, $S(0, 1)$, $S(0, 2)$, and $S(0, 3)$; the branch $B(1)$ comprises segments $S(1, 0)$, $S(1, 1)$, and $S(1, 2)$; the branch $B(2)$ comprises segments $S(2, 0)$, $S(2, 1)$, and $S(2, 2)$; the branch $B(3)$ comprises segments $S(3, 0)$ and $S(3, 1)$; and so forth. That is, a branch $B(i)$ comprises a segment $S(i, j)$, which is formed by connecting two points $P(i, j)$ and $P(i, j+1)$, with the point $P(i, j)$ being a start position and the point $P(i, j+1)$ being an end position of the segment $S(i, j)$.

In the branch structure BS, since the branches $B(1)$, $B(2)$, and $B(3)$ are developed from segments of other branches, the branch $B(0)$ is regarded as a main branch while the branches $B(1)$, $B(2)$, and $B(3)$ are regarded as sub branches. In this embodiment, the segment $S(1, 0)$ is the first segment of the branch $B(1)$, and is a sub branch of the branch $B(0)$, where a start position of the segment $S(1, 0)$ of the branch $B(1)$ is an end position $S(0, 1)$ of the branch $B(0)$. Similarly, the branches $B(2)$ and $B(1)$ are both sub branches of the branch $B(0)$ since that a start position of the segment $S(2, 0)$ of the branch $B(2)$ is an end position of the segment $S(0, 2)$; the branches $B(3)$ is a sub branch of the branch $B(2)$ since that a start position of the segment $S(3, 0)$ of the branch $B(3)$ is an end position of the segment $S(2, 0)$. In other words, supposing a first segment $S(i, 0)$ of a branch $B(i)$ begins at a segment $S(i0, j0)$ of another branch $B(i0)$, the branch $B(i)$ is regarded as a sub branch of the branch $B(i0)$. To emulate a branch structure of natural visual effects, whether another sub branch is developed from a segment of a branch may be determined using a random approach.

According to a slave-master relationship of a sub branch, sub branches of the branch structure BS are respectively given a corresponding sub branch level parameter. For example, the branches $B(1)$ and $B(2)$ are both sub branches of the branch $B(0)$ directly, and thus the branches $B(1)$ and $B(2)$ have an identical sub branch level parameter. The branch $B(3)$ is a sub branch of the branch $B(2)$, and thus the sub branch level parameter of the branch $B(3)$ is lower than that of the branch $B(2)$.

In the segment $S(i, j)$, the points $P(i, j)$ and $P(i, j+1)$ may be points described using three-dimensional axes, which are represented by x, y, and z coordinates. For example, a position of the point $P(i, j)$ is presented as $(x0, y0, z0)$. To emulate a branch structure of natural visual effects, a position of the end point $P(i, j+1)$ of the segment $S(i, j)$ may be randomly determined according to the position of the start position $P(i, j)$.

For example, the three dimensional coordinate of the point $P(i, j)$ is $(x0, y0, z0)$, based on which a circle parallel to plane xy is determined. The circle has a center $(x0, y0, z1)$, and a radius r randomly determined by position statistical information. The position of the point $P(i, j+1)$ is determined by randomly selecting a point on the circumference of the circle. The position statistical information may include information of expected values and variances of the radius r to randomly determine the radius. Further, z1 may equal to z0+dz, where dz is a random value, and the position statistical information may also include expected values and variances of dz. In another embodiment, a triangle, a rectangle, or a randomly selected point is determined according to the three dimensional coordinate $(x0, y0, z0)$ of the point $P(i, j)$ to serve as the position of the point $P(i, j+1)$. Further, with adequate hardware resources, in a preferred embodiment, a spherical surface is determined according to the three-dimensional coordinate $(x0, y0, z0)$ of the point $P(i, j)$, and a point is randomly selected from the spherical surface to serve as the position of the point $P(i, j+1)$.

Different segments of different branches may have different positional statistical information. For example, in a branch with a higher branch level parameter, an expected value of the radius r is greater than that of a branch with a lower branch level parameter. Hence, for a branch with a higher branch level parameter, its segments are distributed in a greater space range. In contrast, in a branch with a lower branch level parameter, an expected value of the radius r is lower than that of a branch with a higher branch level parameter. Hence, for a branch with a lower branch level parameter, its segments are distributed in a smaller space range. Accordingly, the branch structure BS is capable of more realistically emulating branches occurring in natural phenomena.

Each segment $S(i, j)$ is provided with a corresponding display parameter to more realistically render natural visual effects when displaying the branch structure BS. For example, the display parameter includes colors and/or blending alphas of the segments. The blending alpha determines a degree of each segment blending with a background when the segment is displayed, and a low blending alpha means a less apparent segment when being displayed. Segments of different branches may have different display parameters. For example, a branch having a lower branch level parameter also has a lower blending alpha, and thus will be less apparent (i.e., less prominent) when displayed.

Different segments of a same branch B(i) may also have different display parameters. For example, a blending alpha of a segment S(i, j+1) may be lower than that of a segment S(i, j). Further, a situation that the display parameter attenuates along with an increase of the subscript j may be regarded as a life cycle of the display parameter. For example, the blending alpha attenuates less along with the increase of the subscript for a longer life cycle. By controlling the display parameter via the branch level parameter and the life cycle, the branches and segments are able to realistically emulate natural visual effects with well-distributed and organized colors when displaying the branch structure according to the display parameters of the segments. Also, a model may be constructed using a polygonal plane or a three-dimensional pillar for each segment of the branch structure BS, and the display parameter of each segment may also include a texture of a polygonal plane and/or a three-dimensional pillar.

The branch structure BS is generated by the flow 100 in FIG. 2 to respectively determine start position, end position, and display parameter of the segments of the branch structure BS. Steps of the flow 100 are to be described below.

The flow 100 begins with Step 102. In Step 104, the number of the branches in the branch structure BS is determined.

In Step 106, properties of the main branch B(0) are initialized to begin generating the main branch. In this step, the position statistical information, display parameter, and corresponding life cycle of the main branch B(0) are determined. Further, the start position of the first segment S(0, 0) of the branch B(0) is also determined.

In Step 108, it is determined whether the number of branches is reached. Step 110 is performed when the number is not reached, or else Step 116 is performed and the process stops.

In Step 110, preparations for generating segments of a branch B(i) are carried out. The display parameter of the first segment S(i, 0) of the branch B(i) is determined, and the number of segments of the branch B(i) is also determined. In one embodiment, the number of segments may be determined according to the branch level parameter. For example, a branch B(i) with a higher branch level parameter may have a greater number of segments. In this step, the position statistical information may also be determined according to the branch level parameter of the branch B(i).

Step 112 is a segment generating step, and the end position and display parameter of the segment S(i, j) are determined. The end position of the segment S(i, j) is randomly determined according to the start position of the segment S(i, j) and the position statistical information of the branch B(i), and the display parameter (e.g., the blending alpha) of the segment S(i, j) is adjusted according to the life cycle. For example, the display parameter of the segment S(i, j−1) is attenuated to become the display parameter of the segment S(i, j). Further, it is also randomly determined in this step whether to develop another sub branch, and the start position of a new branch is added to a branch start position queue when a result is affirmative. For example, the start position of the branch may be the start position or end position of the segment S(i, j).

In Step 114, it is determined whether the number of segments of the branch B(i) is reached. The method iterates Step 108 when the result is affirmative, or else the method iterates Step 112.

In Step 116, the branch structure BS is completed to display the branches and segments with natural visual effects, and the flow 100 ends. In this embodiment, the completed branch structure is one-time displayed. However, the branch structure is emulated to display characteristics that lightning of the natural phenomena appears downwards from the top via corresponding display parameters, e.g., transparencies of the branches and segments are adjusted by the corresponding display parameters. Further, the emulation of natural phenomena may also be performed with reference to the life cycles and display parameters of the branches and segments.

In one embodiment, the segments are sequentially displayed according to the display parameters of the segments to render natural visual effects. The branches and segments are first given respective weights. The branches with greater weights are displayed before the branches and segments with smaller weights, so as to emulate a branch structure such as lightning of natural phenomena that appears downward from the top. To optimize realness rendered by emulation, different transparencies, fading and blurring effects may be assigned to the branches and segments according to respectively life cycles.

In another embodiment, to reduce system resource consumption, the branches may be first displayed followed by displaying the segments.

In the flow 100, the Steps 110 and 112 may be regarded as one branch generating step, and are iterated to generate the branches B(0), B(1), B(2), . . . of the branch structure BS. When Steps 110 and 112 are performed for the first time in the flow 100, the end position of the segment S(0, 0) may be randomly determined according to the start position of the segment S(0, 0) since the start position of the segment S(0, 0) is already determined in Step 106. Implementing Step 114, Step 112 is iterated to determine the end position and display parameter of the next segment S(0, 1). At this point, the start position of the segment S(0, 1) is the end position of the segment S(0, 0), so that the end position of the segment S(0, 1) is randomly determined. The display parameter (e.g., the blending alpha) of the segment S(0, 1) may be lower than that of the segment S(0, 0), with its attenuation determined according to the life cycle. Step 114 is iterated several times to generate the segments S(0, j) of the branch B(0).

When generating the segments S(0, j) with Step 114, it is also determined whether sub branches are developed from the segments S(0, j). The starting position of each sub branch is determined and added to the branch start position queue when the result is affirmative. For example, in the embodiment shown in FIG. 1, the branch start position queue comprises two branch start positions, i.e., the end position of the segment S(0, 1) and the end position of the segment S(0, 2), when the branch B(0) is generated. Step 110 is again iterated to generate the branch B(1), and the end positions as well as the display properties of each segment S(1, j) of the branch B(1) are determined. When iterating Step 110, since the branch B(1) is a sub branch of the branch B(0), the branch level parameter of the branch B(1) is lower than that of the branch B(0), and thus the number of segments of the branch B(1) is also lower smaller than that of the branch B(0). For example, the number of segments of the branch B(1) is half of that of the branch B(0). The position statistical information of the branch B(1) may also be adjusted according to the branch level parameter. For example, in a circle defined by the start position, an expected radius value may be reduced to half of the original value.

For the first segment S(1, 0) of the branch B(1), a branch start position may be obtained from the branch start position queue, e.g., the end position of the segment S(0, 1) is utilized as the start point of the segment S(1, 0). Further, the display parameter of the segment S(1, 0) is decreased according to the branch level parameter. For example, since the segment S(1, 0) is developed from the segment S(0, 1), the display parameter of the segment S(0, 1) is attenuated to provide the display parameter of the segment S(1, 0). Step 112 is then repeatedly iterated to provide the segments S(1, j) of the branch B(1).

In the embodiment shown in FIG. 1, Steps 110 and 112 are iterated to generate the branches B(1) and B(2). When the branch B(2) is completed, the end position of the segment S(2, 0) is added to the branch start position queue to serve as the start position of the branch B(3). Steps 110 and 112 are again iterated to generate the branch B(3), and so forth.

In the segment generating steps for determining the end position of respective segments, the segments are generated speedily since only simple random steps are utilized in the flow 100. Hence, the branches of the entire branch structure are rapidly generated with high efficiency for realizing real-time natural visual effects.

Figure 3:
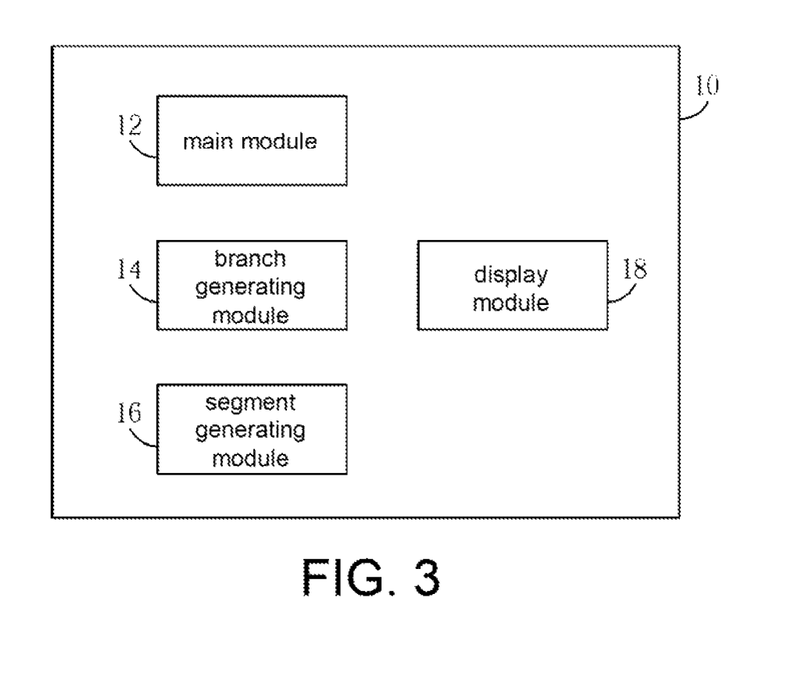
FIG. 3 is a schematic diagram of an apparatus according to an embodiment of the present invention.

FIG. 3 shows an apparatus 10 according to an embodiment of the present invention. For example, the apparatus 10 is an electronic device with a display function, e.g., a computer, a handheld device, or a multimedia playback device. A branch structure is established by implementing the flow 100 to accordingly display emulated natural visual effects. The apparatus 10 comprises a main module 12, a branch generating module 14, a segment generating module 16, and a display module 18. The main module 12 prompts the branch module 14 to operate repeatedly to generate the branch of the branch structure. The branch module 14 prompts the segment generating module 16 to operate repeatedly to generate the segments of respective branches. The branch generating module 14 determines the number of iterations of the segment generating module 16 according to branch level parameters corresponding to the branches.

When prompting the segment generating module 16 to iterate operations to generate the segments of a branch, the branch generating module 14 provides corresponding position statistical information for the branch according to the branch level parameter of the branch. When the segment generating module 16 iterates operations, the start position of the current operation is updated according to the end point of the previous operation, and the end point of respective segments is randomly determined according to the position statistical information and the start position.

When the segment generating module 16 performs operations for the first time to provide a first segment of a branch, the display parameter and life cycle corresponding to the first segment are defined according to the branch level parameter corresponding to the branch. When the segment generating module 16 iterates operations to generate other segments of the branch, the display parameter may be updated according to the display parameter and the life cycle of a previous operation.

In iterated operations of the segment generating module 16, a branch start position is added to a branch start position queue when it is determined to provide another branch from a predetermined segment. When the main module 12 prompts the branch generating module 14 to operate repeatedly, the start position of respective branches is sequentially obtained from the branch start position queue each time the branch generating module 14 iterates operations to serve as the start position of a first operation of the segment generating module 16.

When the branch structure is completed, the display module 18 displays the branch structure according to the display parameters of the segments to render natural visual effects. The main module 12, the branch generating module 14, the segment generating module 16, and the display module 18 may be realized by any combination of hardware, firmware, and/or software. To display the branch structure according to the display parameters of the segments, the display module 18 may further comprise a driver for a graphic library (e.g., an open GL library). When generating graphics, the driver calls for the graphic library and transmits the start positions and end positions of the branches and the segments to the graphic library, so that the graphic library generates graphics according to the start positions and the end positions of the branches and the segments.

In this embodiment, the completed branch structure is one-time displayed. However, the branch structure is emulated to display characteristics that lightning of the natural phenomena exhibits, and appears downwards from the top via corresponding display parameters, e.g., transparencies of the branches and segments are adjusted by the corresponding display parameters during rendering. Further, the emulation of natural phenomena may also be performed with reference to the life cycles and display parameters of the branches and the segments.

In one embodiment, the display module 18 sequentially displays the segments according to the display parameters of the segments to render natural visual effects. The branches and the segments are first given respective weights. The branches with greater weights are displayed before the branches and the segments with smaller weights, so as to emulate a branch structure such as lightning of natural phenomena that appears downward from the top. To optimize realness rendered by emulation, the display module 18 displays the branches and segments with different transparencies, fading and blurring effects according to respectively life cycles.

In another embodiment, to reduce system resource consumption, the branches may be first displayed followed by displaying the segments.

Figure 3A:
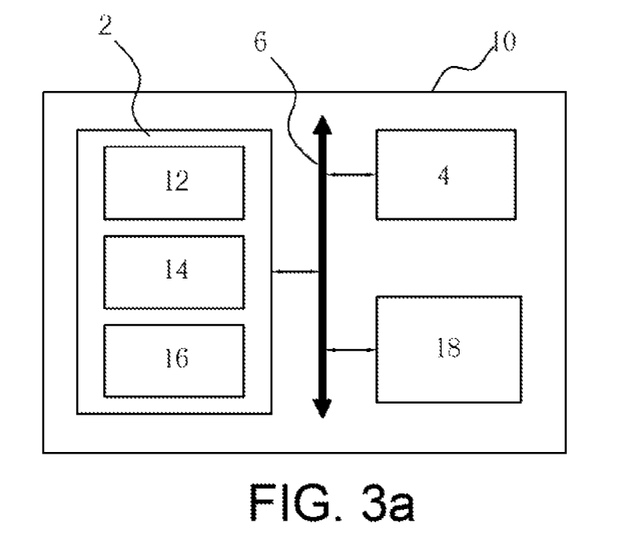
FIG. 3a is a schematic diagram of an apparatus according to another embodiment of the present invention.

FIG. 3A shows a schematic diagram of the apparatus 10 according to another embodiment of the present invention. The apparatus 10 further comprises a memory 2, a processor 4, and a communication bus 6. The main module 12, the branch generating module 14, and the segment generating module 16 are stored in the memory 2. The processor 4 accesses and controls the main module 12, the branch generating module 14 and the segment generating module 16 via the bus 6 to perform operations for generating the branch structure BS. When the branch structure is completed, the processor 4 transmits the branch structure BS to the display module 18 realized by hardware and firmware, and the display module 18 then displays the branch structure with natural visual effects to the user.

Figure 4:
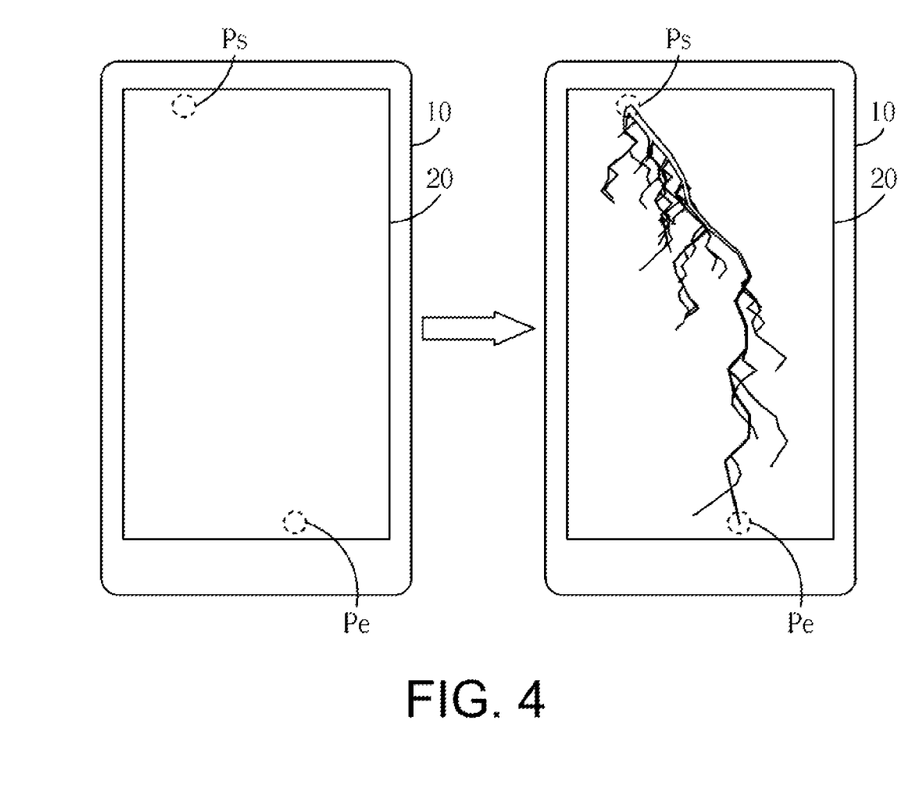
FIGS. 4 and 5 are schematic diagrams illustrating a branch structure displayed with natural visual effects according to an embodiment of the present invention.

FIG. 4 shows a schematic diagram of generating a branch structure according to an embodiment of the present invention. The apparatus 10 may further comprise a display 20. By appointing end points Ps and Pe, the flow 100 of the present invention is implemented to present natural visual effects of lightning using a branch structure. For example, in the branch structure BS (FIG. 1), the end point Ps is the start position of the first segment of the main branch B(0), and the end point Pe is the end position of the last segment of the main branch B(0). When forming the segments of the main branch, the position statistical information of the end positions of the segments may be adjusted according to the position of the end point Pe, such that the main branch B(0) may gradually approach the end point Pe. The end position of the last segment may be directly determined by the position of the end point Pe.

The positions of the end points Ps and/or Pe are determined by the apparatus 10. For example, the apparatus 10 may cyclically, automatically, and randomly determine the positions of the end points Ps and Pe to present natural visual effects with a branch structure to be used as a screensaver. For example, the display 20 may be a touch panel, and the end points Ps and Pe are determined by a user touch. For example, the end point Ps is predetermined by the apparatus 10. When the user touches a point on the touch screen 20, the apparatus 10 regards the touched point as the end point Pe, and quickly completes the generation and display of a branch structure to provide the user interactive natural visual effects. For another example, the display 20 is a multi-touch monitor. When the user touches two points on the touch screen, the apparatus 10 regards the two touched points as the end points Ps and Pe, between which a branch structure is formed.

To truly reflect lightning in a branch structure, the brightness near the end point Ps may be increased to simulate a start point of the lightning.

Figure 5:
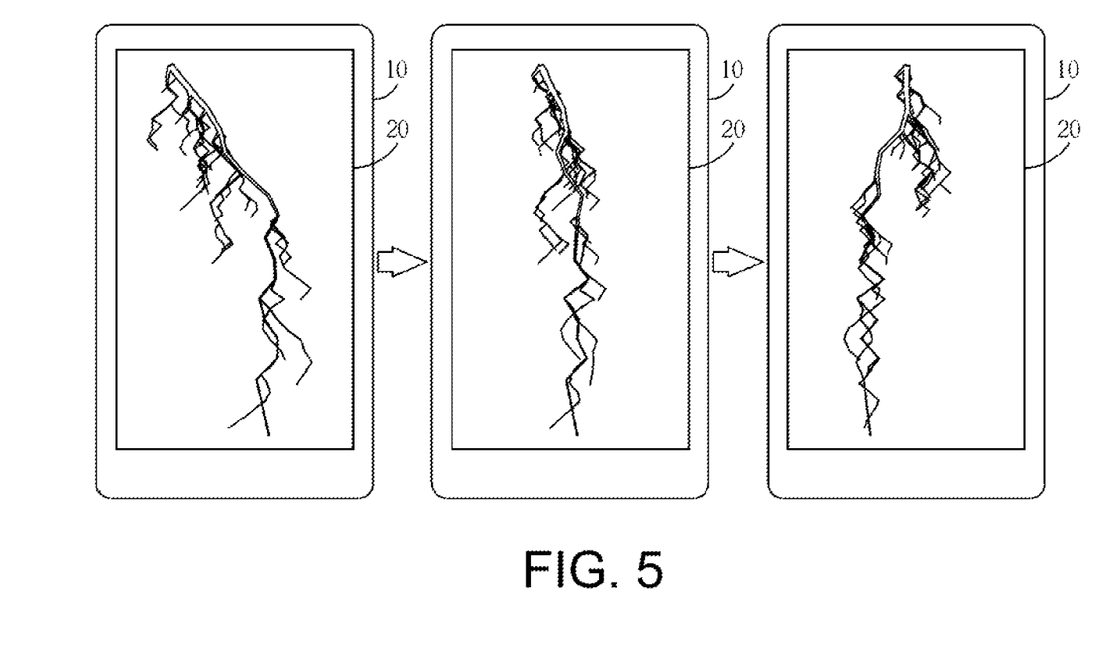

The branch structure BS may be two-dimensional or three-dimensional. That is, the start position and end position of respectively segments may be located in a two-dimensional or three-dimensional space. When the branch structure is established in a three-dimensional space, the branch structure BS may be displayed by different angles. FIG. 5 shows a schematic diagram of a branch structure display natural visual effects according to an embodiment of the present invention. When the branch structure BS is generated in a three-dimensional space, the apparatus 10 displays the same branch structure BS from different angles. For example, the apparatus 10 cyclically and automatically changes a display angle, or displays according to a user-defined angle (e.g., a rotation direction or angle determined by a touching gesture), so as to increase interactivities of natural visual effects. Further, tributaries and main streams of a river, trees, corals, antlers, cracks, and mountain landscapes, can all be displayed by a branch structure in an appropriate polygonal plane or a three-dimensional pillar module as well as surface texture on the display 20.

Figure 6A:
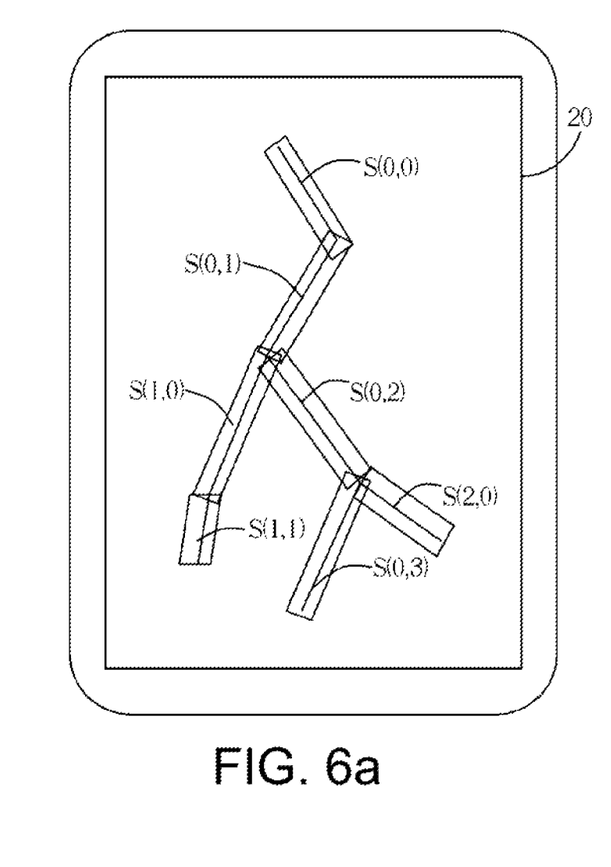
FIGS. 6a to 6e are a flowchart of displaying a branch structure according to an embodiment of the present invention.

FIGS. 6a to 6e show a result of flow 200 displaying a branch structure according to an embodiment of the present invention. In the flow 200, a process that a first branch structure displayed on the display 20 is illustrated. The first branch structure comprises branches S(0, 0), S(0, 1), S(0, 2), S(0, 3), and segments S(1, 0), S(1, 1), and S(2, 0). FIG. 6a shows a schematic diagram of the first branch structure and graphics of the branches and segments corresponding to the first branch structure. The corresponding graphics are in units of branches and segments, and are capable of individually, independently, and non-parallel adjusting display parameters corresponding to the graphics. The display parameters include hue, transparency, blending alpha, and life cycle, so that the corresponding graphics may be respectively presented with different colors, fading-in and fading-out effects as well as display life cycles to accomplish the object of emulating natural visual effects.

In FIG. 6a, the branches and the segments of the first branch structure and the corresponding graphics are drawn to the display 20 via the graphic library. However, at this point, the transparency of the graphics is set to a maximum value (i.e., most transparent) so that the hue of the first branch structure is not displayed on the display 20. Therefore, at the time of being displayed as illustrated in FIG. 6a, the first branch structure is not displayed to the display 20 from the perspective of the user.

Figure 6B:
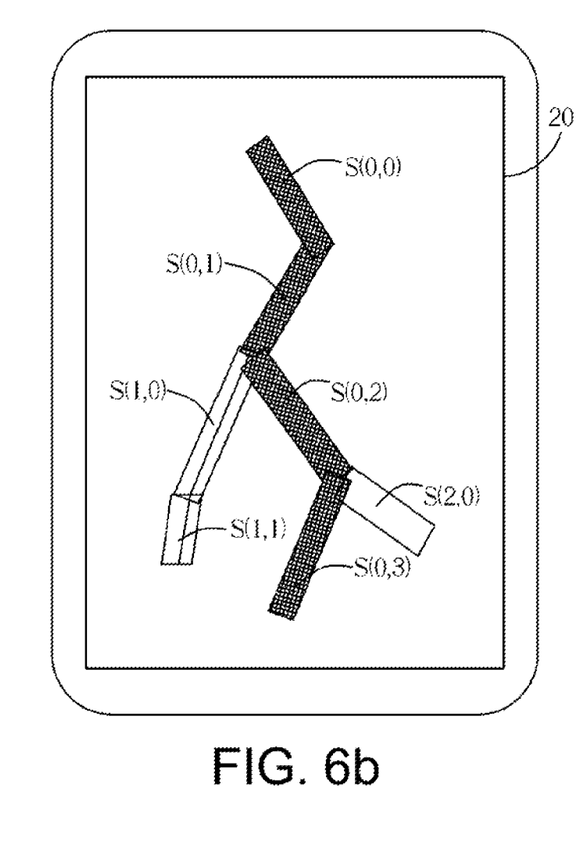

In this embodiment, the complete first branch structure is one-time displayed on the display 20. However, the first branch structure is emulated to display characteristics that lightning of the natural phenomena appears downwards by adjusting the transparency of the first branch structure. Referring to FIG. 6b, the transparencies of the branches of the first branch structure are reduced (less transparent), so as to display the branches of the first branch structure on the display 20. At this point, the branches (e.g., an upper part of a lightning bolt) of the first branch structure are displayed on the display 20 from the perspective of a user. To further reinforce visual effects of the branches, hue parameters may be adjusted. That is, under the circumstances that transparency is reduced, the hue parameters are increased to darken colors of the branches, so that the branches are analogically presented in a gradual manner on the display 20 instead of being digitally presented in a drastic manner.

Figure 6C:
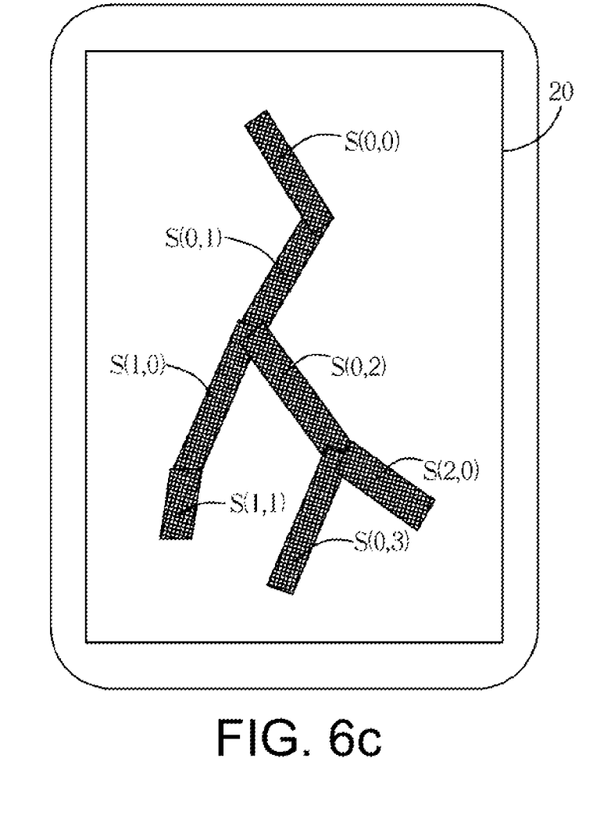

In FIG. 6c, the transparencies of the segments of the first branch structure are reduced (less transparent), so that the segments of the first branch structure are displayed on the display 20. Meanwhile, the transparencies and hues of the branches are maintained the same as those in FIG. 6c, or further increased to accentuate the visual effects of the segments. Similar to the operations performed on the branches, under the circumstances that transparency is reduced, the hue parameters are adjusted to darken colors of the branches.

Figure 6D:
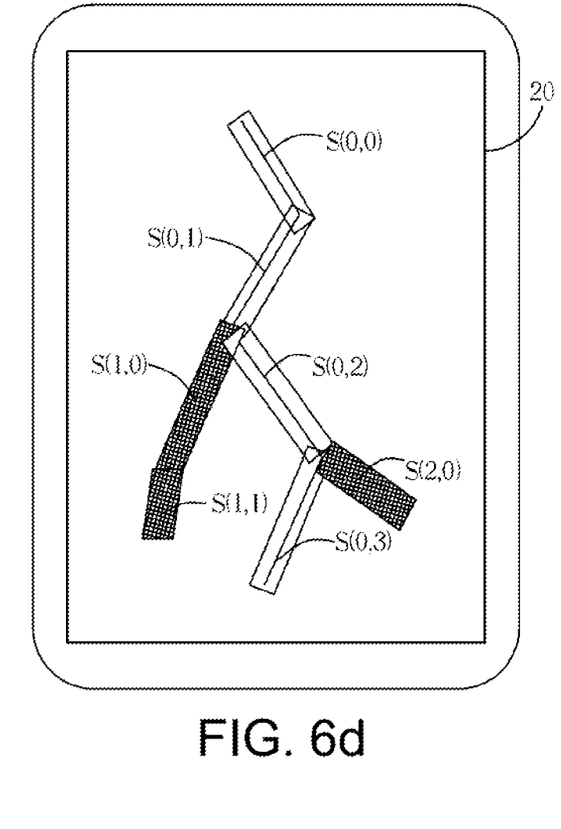

In FIG. 6d, the transparencies of the branches of the first branch structure are again increased (more transparent), so that the branches of the first branch structure appear less apparent on the display 20. From the perspective of a user, the branches (e.g., an upper part of lightning) of the first branch structure appear as gradually disappearing. To reinforce the disappearing visual effects of the branches, the hue parameters are adjusted to lighten colors of the branches under circumstances that the transparency is increased, so that the branches are analogically vanished in a gradual manner on the display 20 instead of being digitally vanished in a drastic manner.

Figure 6E:
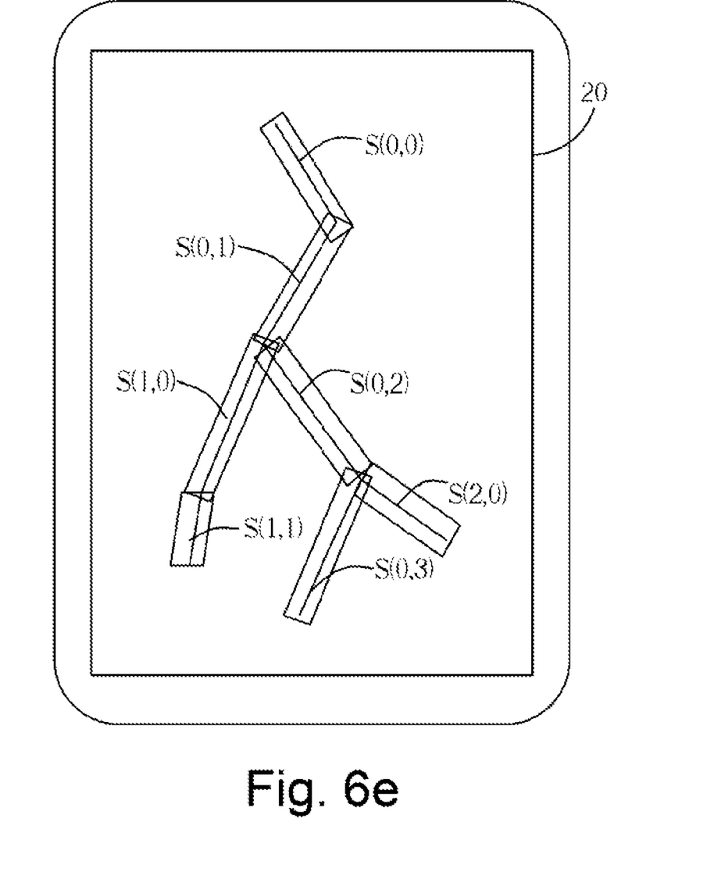

In FIG. 6e, the segments of the first branch structure are again increased (more transparent) such that the segments of the first branch structure disappear from the display 20. Meanwhile, the transparencies and hues of the branches are maintained the same as those in FIG. 6d, or further reduced to accentuate the disappearing visual effects of the segments. Similar to the operations performed on the branches, under the circumstances that transparency is reduced, the hue parameters are adjusted to darken colors of the branches.

In this embodiment, although the transparency and hue are utilized as parameters for controlling the appearance and disappearance of the branches and segments of the first branch structure, it is appreciated by a person skilled in the art the above parameters may be adjusted for accommodating different graphic libraries for drawing graphics. For example, when using open GL ES libraries of different versions, life cycle parameters may be implemented to control the appearance and disappearance parameters of hues and transparencies. More specifically, the life cycle parameters may define timings (e.g., the number of frames consisted in the branches and segments, or an updating interval) according to which the branches and segments appear on and disappear from the display 20, so as to present the appearance and disappearance of the branches and segments on the display 20 via libraries corresponding to the life cycle parameters. The libraries corresponding to the life cycle parameters may be built-in graphic libraries or user-defined libraries.

In this embodiment, the completed branch structure is one-time displayed. However, the branch structure is emulated to display characteristics that lightning of the natural phenomena appears downwards from the top via corresponding display parameters, e.g., transparencies of the branches and segments are adjusted by the corresponding display parameters. Further, the emulation of natural phenomena may also be performed with reference to the life cycles and display parameters of the branches and segments. It is to be noted that, apart from one-time displaying the completed branch structure according to the related description of the flow 100, the segments may also be sequentially displayed according to the display parameters of the segments to render natural visual effects. The branches and the segments are first given respectively weights. The branches with greater weights are displayed before the branches and segments with smaller weights, so as to emulate a branch structure such as lightning of natural phenomena that appears downward from the top. Alternatively, to reduce system resource consumption, the branches may be first displayed followed by displaying the segments.

With the description of the above embodiments, it is illustrated that the present invention is capable of speedily and efficiently emulating a natural branch structure, so as to render real-time, realistic, and highly interactive natural visual effects to enrich display contents of an electronic device.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A non-transitory computer-readable storage medium with an executable program stored thereon, wherein the program instructs a microprocessor to perform a method for displaying a branch structure, said method comprising:
    performing a segment generating step by a microprocessor, comprising:
        providing a start position defined as a three-dimensional coordinate (x0, y0, z0);
        providing an interplanar distance statistical distribution;
        selecting an interplanar distance dZ according to said interplanar distance statistical distribution;
        providing a radius statistical distribution;
        selecting a radius according to said radius statistical distribution;
        defining an end position to be on a circumference based on said radius that lies parallel to an xy plane corresponding to said three-dimensional coordinate, at said distance dZ from the xy plane;
        providing a segment according to the start position and the end position, and providing a first branch by utilizing the segment; and
        determining whether to provide a second branch from the segment, and providing the second branch accordingly;
    forming the branch structure from the first branch and the second branch; and
    visually and segmentally displaying the branch structure.

2. The non-transitory computer-readable storage medium according to claim 1, said method, further comprising:
    iterating the segment generating step for a first number of times to perform a branch generating step, wherein, in each iteration of the segment generating step, the start position of a current segment generating step is updated according to the end position of a previous segment generating step; and
    forming the branch structure from the first number of segments provided by the first number of segment generating step.

3. The non-transitory computer-readable storage medium according to claim 2, said method, further comprising:
    providing a corresponding branch level parameter for the branches in the branch generating step, respectively; and
    determining a value of the first number according to the branch level parameter when performing the branch generating step.

4. The non-transitory computer-readable storage medium according to claim 2, said method, further comprising:
    providing a corresponding branch level parameter for the branches in the branch generating step, respectively; and
    providing corresponding position statistical information for the branch level parameter corresponding to the branch when performing the branch generating step;
    wherein, the end position is randomly provided according to the position statistical information when iterating the segment generating step.

5. The non-transitory computer-readable storage medium according to claim 2, said method, further comprising:
    iterating the branch generating step for a second number of times, and providing the branch structure according to the second number provided by iterating the iterating step for the second number of times.

6. The non-transitory computer-readable storage medium according to claim 5, said method, further comprising:
    adding a branch start position to a branch start position queue when it is determined to provide a second branch;
    wherein, when iterating the branch generating step, the start position of the branches are respectively obtained in sequence from the branch start position queue to serve as the start position in a first branch generating step.

7. The non-transitory computer-readable storage medium according to claim 2, said method, further comprising:
    providing a corresponding branch level parameter for the branches in the branch generating step, respectively,
    wherein, the branch generating step further comprising, when providing a first segment when performing a first segment generating step, providing a corresponding display parameter according to the branch level parameter corresponding to the branch.

8. The non-transitory computer-readable storage medium according to claim 7, said method, further comprising:
    updating the display parameter of a current segment generating step according to the display parameter of a previous segment when iterating each segment generating step.

9. The non-transitory computer-readable storage medium according to claim 2, said method, further comprising:
    visually and segmentally displaying the segments according to one or more display parameters corresponding to the segments of the branch structure when displaying the branch structure.

10. The non-transitory computer-readable storage medium according to claim 1, wherein said interplanar distance statistical distribution of said providing an interplanar distance statistical distribution step further comprises an interplanar expected distance and an interplanar distance variance; and wherein said radius statistical distribution of said providing a radius statistical distribution step further comprises an expected radius and a radius variance.

11. An apparatus for displaying a branch structure, comprising:
    a segment generating module, for providing an end position and a start position, providing a segment according to the start position and the end position, to provide a first branch based on the segment, and determining whether to provide a second branch from the segment; and a display module, coupled to the segment generating module, for visually and segmentally displaying a branch structure formed by the first branch and the second branch;

wherein the segment generating module provides the end position by:

defining a three-dimensional coordinate of the start position as (x0, y0, z0);

providing an interplanar distance statistical distribution;

selecting an interplanar distance dZ according to said interplanar distance statistical distribution;

providing a radius statistical distribution;

selecting a radius according to said radius statistical distribution; and defining said end position to be on a circumference based on said radius that lies parallel to an xy plane corresponding to said three-dimensional coordinate, at said distance dZ from the xy plane.

12. The apparatus according to claim 11, further comprising:

a branch generating module, for prompting the segment generating module to iterate operations for a first number of times and forming the first branch by utilizing the first number of segments, and updating the start position of a current operation according to the end position of a previous operation when the segment generating module iterates operations.

13. The apparatus according to claim 12, further providing a branch level parameter corresponding to the first branch provided by the branch generating module, and providing a display parameter corresponding to a first segment according to the branch level parameter corresponding to the first branch when the first branch is provided by a first operation of iterated operations of the segment generating module.

14. The apparatus according to claim 13, wherein when the display module displays the branch structure, the segments are visually and segmentally displayed according to the display parameters corresponding to the segments of the branch structure.

15. The apparatus according to claim 13, wherein when the branch generating module prompts the segment generating module to iterate operations, the display parameter of the current operation is updated according to the display parameter of the previous operation of the segment generating module.

16. The apparatus according to claim 13, wherein the branch generating module determines a value of the first number according to the branch level parameter corresponding to the first branch.

17. The apparatus according to claim 13, wherein the branch generating module provides position statistical information corresponding to the first branch according to the branch level parameter corresponding to the first branch, and the segment generating module provides the end position according to the position statistical information when the segment generating module iterates operations.

18. The apparatus according to claim 13, further comprising a main module for prompting the branch generating module to iterate operations for a second number of times, so as to provide the branch structure accordingly.

19. The apparatus according to claim 18, wherein a branch start position is added to a start position queue when it is determined to provide the second branch from the segment in operations of the segment generating module and the branch start position is sequentially obtained from the branch start position queue to serve as the start position of a first operation of the segment generating module when the main module prompts the branch generating module to iterate operations.

20. The apparatus according to claim 11 wherein said interplanar distance statistical distribution further comprises an interplanar expected distance and an interplanar distance variance, and said radius statistical distribution further comprises an expected radius and a radius variance.

* * * * *